United States Patent
Jiang

[11] Patent Number: 5,894,214
[45] Date of Patent: Apr. 13, 1999

[54] DUAL-OUTPUT BOOST CONVERTER HAVING ENHANCED INPUT OPERATING RANGE

[75] Inventor: Yimin Jiang, Plano, Tex.

[73] Assignee: Lucent Technologies Inc., Murray Hill, N.J.

[21] Appl. No.: 08/975,398

[22] Filed: Nov. 20, 1997

[51] Int. Cl.[6] .................................... G05F 1/613
[52] U.S. Cl. ................ 323/222; 323/266; 323/271; 363/89
[58] Field of Search .................... 323/222, 266, 323/268, 271, 272, 282, 351; 363/89

[56] References Cited

U.S. PATENT DOCUMENTS

| | | | |
|---|---|---|---|
| 4,533,986 | 8/1985 | Jones | 323/266 |
| 4,622,511 | 11/1986 | Moore | 323/272 |
| 4,743,835 | 5/1988 | Bosse et al. | 323/266 |
| 4,792,887 | 12/1988 | Bernitz et al. | 363/89 |
| 4,940,929 | 7/1990 | Williams | 323/222 |
| 5,181,159 | 1/1993 | Peterson et al. | 363/89 |
| 5,412,308 | 5/1995 | Brown | 323/272 |
| 5,414,613 | 5/1995 | Chen | 323/222 |
| 5,436,550 | 7/1995 | Arakawa | 323/266 |
| 5,627,455 | 5/1997 | Jacobs et al. | 323/222 |
| 5,771,168 | 6/1998 | Liao et al. | 363/89 |

*Primary Examiner*—Jeffrey Sterrett

[57] ABSTRACT

A boost converter for converting an input voltage received at an input thereof into first and second output voltages provided at first and second outputs thereof, respectively, and a method of operating the boost converter. In one embodiment, the boost converter includes: (1) a first switching circuit coupled to a first rail of the input and having a first switch and a first capacitor coupled in parallel, (2) a second switching circuit coupled to a second rail of the input and having a second switch and a second capacitor coupled in parallel, (3) a contactor, coupled between the first and second switching circuits and the first and second rails, that is controllable to achieve alternative first and second states in which: (3a) in the first state, the first and second switching circuits are coupled in series across the source of AC power and (3b) in the second state, the first and second switching circuits are coupled in parallel across the source of AC power to reduce an overall loss associated with the first and second switches and (4) a boost inductor, coupled in series with first and second switching circuits, that provides a conductive path for the input DC voltage to flow through the first and second switching circuits to charge the first and second capacitors, respectively.

20 Claims, 4 Drawing Sheets

DUAL-OUTPUT BOOST CONVERTER HAVING ENHANCED INPUT OPERATING RANGE

TECHNICAL FIELD OF THE INVENTION

The present invention is directed, in general, to power converters and, more specifically, to a boost converter having at least two alternative modes of operation to improve the efficiency thereof under certain operating conditions and a method of operating such converter to improve its efficiency.

BACKGROUND OF THE INVENTION

A power converter is a power processing circuit that converts an input voltage or current source into a specified output voltage or current. In off-line applications wherein power factor correction, total harmonic distortion (THD) reduction and a stable, regulated voltage are desired, the converter often employs a boost converter.

The converter generally includes an electromagnetic interference (EMI) filter, coupled to a source of alternating current (AC) power. A rectifier bridge, coupling the EMI filter to the boost converter, rectifies the AC power to produce an unregulated DC voltage. The boost converter receives the unregulated DC voltage and generates therefrom a controlled DC voltage. A DC/DC converter, coupled to the boost converter, then converts the high DC voltage (e.g., 400 VDC or 800 VDC) to a lower voltage (e.g., 48 VDC or 24 VDC).

A conventional boost converter generally includes an inductor, coupled between an input voltage (e.g., the unregulated DC voltage from the rectifier bridge) and a power switch. The power switch is then coupled in parallel with a rectifying diode and an output capacitor. The output capacitor is usually large to ensure a constant output voltage to a load (e.g., a DC/DC converter). The output voltage (measured at the load) of the boost converter is always greater than the input voltage.

The boost converter operates as follows. When the power switch is conducting, the rectifying diode is reverse-biased, isolating the output capacitor and, therefore, the load. During this period, the input voltage supplies energy to charge the inductor and an inductor current rises. A stored charge in the output capacitor powers the load. When the power switch is not conducting, the inductor current decreases, as energy from both the inductor and the input flows forward through the rectifying diode, charging the output capacitor and powering the load. The output voltage of the boost converter can thus be controlled by varying a duty cycle of the power switch.

For high AC input voltages, in conjunction with the output voltage of the boost converter being greater than the input DC voltage, the output of the conventional boost converter may be too high for commonly available semiconductor devices. A so-called "three-level" boost converter that provides two equal output voltages has been suggested to accommodate semiconductor devices rated for approximately half the total output voltage. The three-level boost converter generally consists of an inductor and two switching circuits (each having a power switch, rectifying diode and output capacitor) coupled in series. By dividing the total output voltage between two outputs, the three-level boost converter reduces maximum voltage stresses across the semiconductor devices. Separate DC/DC converters may then be used with each output. If two DC/DC converters are used, only half of the total output voltage is applied to each DC/DC converter. Switching devices in the DC/DC converters, therefore, can also be rated at half of the total output voltage.

For high input voltages, the three-level boost converter allows the use of lower voltage switching devices and a smaller boost inductor, thus providing better performance than the conventional boost converter. For wide input applications, however, the conversion efficiency of the three-level boost converter is quite poor at a low end of the input range, since the input current must flow through multiple switching devices.

Accordingly, what is needed in the art is a boost converter topology that obtains an improved conversion efficiency over a wide input range.

SUMMARY OF THE INVENTION

To address the above-discussed deficiencies of the prior art, the present invention provides a boost converter for converting an input voltage received at an input thereof into first and second output voltages provided at first and second outputs thereof, respectively, and a method of operating the boost converter. In one embodiment, the boost converter includes: (1) a first switching circuit coupled to a first rail of the input and having a first switch and a first capacitor coupled in parallel, (2) a second switching circuit coupled to a second rail of the input and having a second switch and a second capacitor coupled in parallel, (3) a contactor, coupled between the first and second switching circuits and the first and second rails, that is controllable to achieve alternative first and second states in which: (3a) in the first state, the first and second switching circuits are coupled in series across the source of AC power and (3b) in the second state, the first and second switching circuits are coupled in parallel across the source of AC power to reduce an overall loss associated with the first and second switches and (4) a boost inductor, coupled in series with the first and second switching circuits, that provides a conductive path for the input DC voltage to flow through the first and second switching circuits to charge the first and second capacitors, respectively.

The present invention therefore introduces the broad concept of a boost converter having multiple outputs that is reconfigurable to increase the range of input voltages with which the converter can operate.

In one embodiment of the present invention, the first switching circuit further has a first output rectifying diode, coupled to the first switch and the first capacitor, that causes the first output voltage to be a DC voltage. In a related embodiment, the second switching circuit has a second output rectifying diode, coupled to the second switch and the second capacitor, that causes the second output voltage to be a DC voltage. The second output rectifying diode may be located near the second rail or the contactor.

In one embodiment of the present invention, a single-phase rectifier supplies the input voltage, the input voltage being a DC input voltage. In a related embodiment, the rectifier is a threephase rectifier. In a related embodiment, the rectifier is coupled, via an electromagnetic interference (EMI) filter, to a source of AC power. Those skilled in the art will appreciate that the above-described elements are enhancements to the present invention and are not required thereby.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
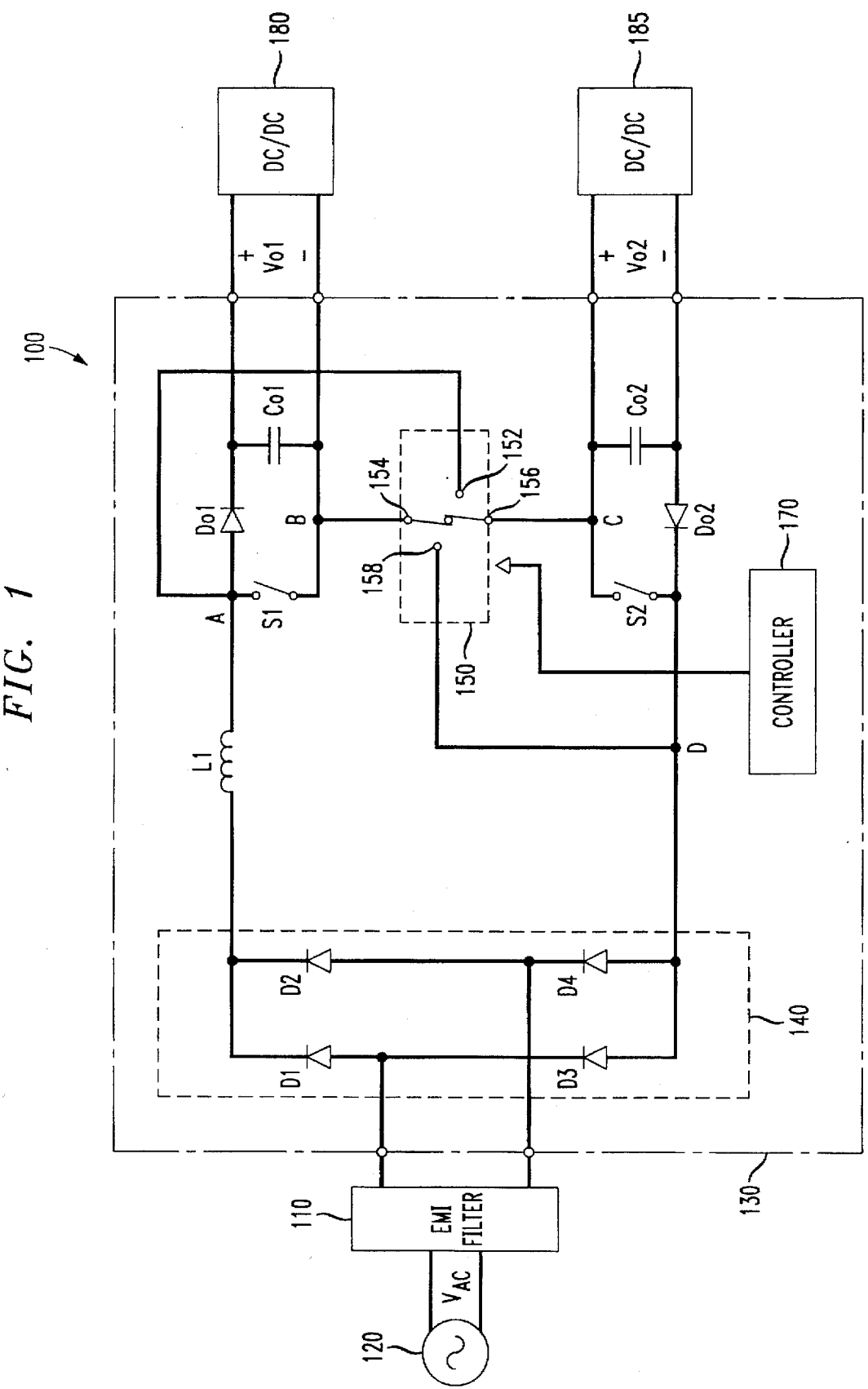
FIG. 1 illustrates a schematic diagram of an embodiment of a converter constructed according to the principles of the present invention.

Referring initially to FIG. 1, illustrated is a schematic diagram of an embodiment of a converter 100 constructed according to the principles of the present invention. The converter 100 includes an EMI filter 110 coupled to a source of AC power 120 and having an input voltage Vac. The converter 100 further includes a high efficiency wide-input dual-output boost converter 130 having an input and first and second outputs, coupled to the EMI filter 110. The boost converter 130 receives filtered AC power at the input and generates therefrom first and second output voltages Vo1, Vo2 at the first and second outputs, respectively. The converter 100 still further includes first and second DC/DC converters 180, 185, coupled to the first and second outputs of the boost converter 130, respectively. The EMI filter 110 and the first and second DC/DC converters 180, 185 are well known in the art and, as a result, will not be described in detail.

The boost converter 130 includes a rectifier bridge (rectifier) 140 that couples the boost converter 130 to the EMI filter 110. In the illustrated embodiment, the rectifier bridge 140 is a single-phase rectifier, consisting of rectifying diodes D1, D2, D3, D4. Those skilled in the art should realize that other types of rectifying devices may also be used to form the rectifier bridge 140. The rectifier bridge 140 converts the input voltage Vac into a rectified DC voltage (DC input voltage). In an alternative embodiment of the present invention, the rectifier bridge 140 may be a three-phase rectifier for use with three-phase input voltages.

In the illustrated embodiment, the boost converter 130 further includes a first switching circuit, coupled, via an inductor L1, to a first rail of the rectifier bridge 140. The boost converter 130 further includes a second switching circuit, coupled to a second rail of the rectifier bridge. The inductor L1 is thus coupled in series with the first and second switching circuits. The boost converter 130 further includes a contactor 150 coupled between the first and second switching circuits and the first and second rails. "Contactor," for purposes of the present invention, is broadly defined as anything capable of establishing a conductive path from one location to another. "Contactor" therefore includes a wide array of devices, such as solid state switches (such as transistors), relays, jumpers, wires, soldered connections and the like. The contactor of the illustrated embodiment is most typically called upon to transition between conductive and nonconductive states only occasionally, making or breaking a conductive path relatively infrequently.

The boost converter 130 further includes a controller 170 that switches the contactor 150 to place the first and second switching circuits in either a parallel or a series configuration.

The first switching circuit includes a first switch S1, coupled in parallel to a first capacitor Co1. The first switching circuit further includes a first output rectifying diode Do1, coupled in parallel with the first switch S1 and in series with the first capacitor Co1. The first switch S1 produces a first switched voltage that is rectified by the first output rectifying diode Do1 to a DC voltage. The first switching circuit then provides the first output voltage Vo1 across the first output capacitor Co1. A first node A, between the first switch S1 and the first output rectifying diode Do1, is coupled to a first terminal 152 of the contactor 150. A second node B, between the first switch S1 and the first capacitor Co1, is coupled to a second terminal 154 of the contactor 150.

The second switching circuit includes a second switch S2 coupled in parallel to a second capacitor Co2. The second switching circuit further includes a second output rectifying diode Do2, coupled in parallel with the second switch S2 and in series with the second capacitor Co2. The second switch S2 produces a second switched voltage that is rectified by the second output rectifying diode Do2 to a DC voltage. The second switching circuit then provides the second output voltage Vo2 across the second output capacitor Co2. A third node C, between the second switch S2 and the second capacitor Co2, is coupled to a third terminal 156 of the contactor 150. A fourth node D, between the second switch S2 and the second output rectifying diode Do2, is coupled to a fourth terminal 158 of the contactor 150.

In the illustrated embodiment of the present invention, the first and second switches S1, S2 are metal-oxide semiconductor field-effect transistors (MOSFETs). Of course, the use of other types of switches is well within the broad scope of the present invention.

In the present embodiment, the first output voltage Vo1 is equivalent to the second output voltage Vo2. If the first and second DC/DC converters 180, 185 are equivalent, the outputs of the first and second DC/DC converters 180, 185 may then be paralleled to provide a single DC output. Of course, those skilled in the art will realize that the first output voltage Vo1 may be different from the second output voltage Vo2, and that the equivalency of the first and second output voltages Vo1, Vo2 is not integral to the present invention.

For high input voltages, when a peak of the input voltage Vac of the AC power is more than the first or second output voltage Vo1, Vo2, the controller 170 maintains the contactor 150 in a first state. The second terminal 154 is coupled to the third terminal 156 via an intermediate terminal. The first and second switching circuits are thus coupled in series across the source of AC power 120.

In the series configuration, the boost converter 130 may function as a conventional three-level boost converter. The first and second switches S1, S2 conduct for a first period of operation, applying the DC input voltage to the inductor L1 and raising an inductor current. During the first period, stored charges in the first and second capacitors Co1, Co2 provide DC power to the first and second DC/DC converters 180, 185, respectively.

Then, during a complementary period of operation, the first and second switches S1, S2 turn off. A voltage difference between a sum of the output voltages Vo1, Vo2 and the DC input voltage is applied to the inductor L1, thereby lowering the inductor current. The inductor L1 provides a conductive path for the DC input voltage to flow through the first and second switching circuits. Energy from the inductor L1 and the DC input voltage charges the first and second capacitors Co1, Co2 and provides DC power to the first and second DC/DC converters 180, 185. Various methods of controlling the duty cycle of the first and second switches S1, S2 (e.g., pulse-width modulation) are familiar to those skilled in the art and, as a result, will not be discussed. The first and second DC/DC converters 180, 185 then convert the first and second output voltages Vo1, Vo2 into first and second regulated DC voltages for powering a load.

Figure 2:
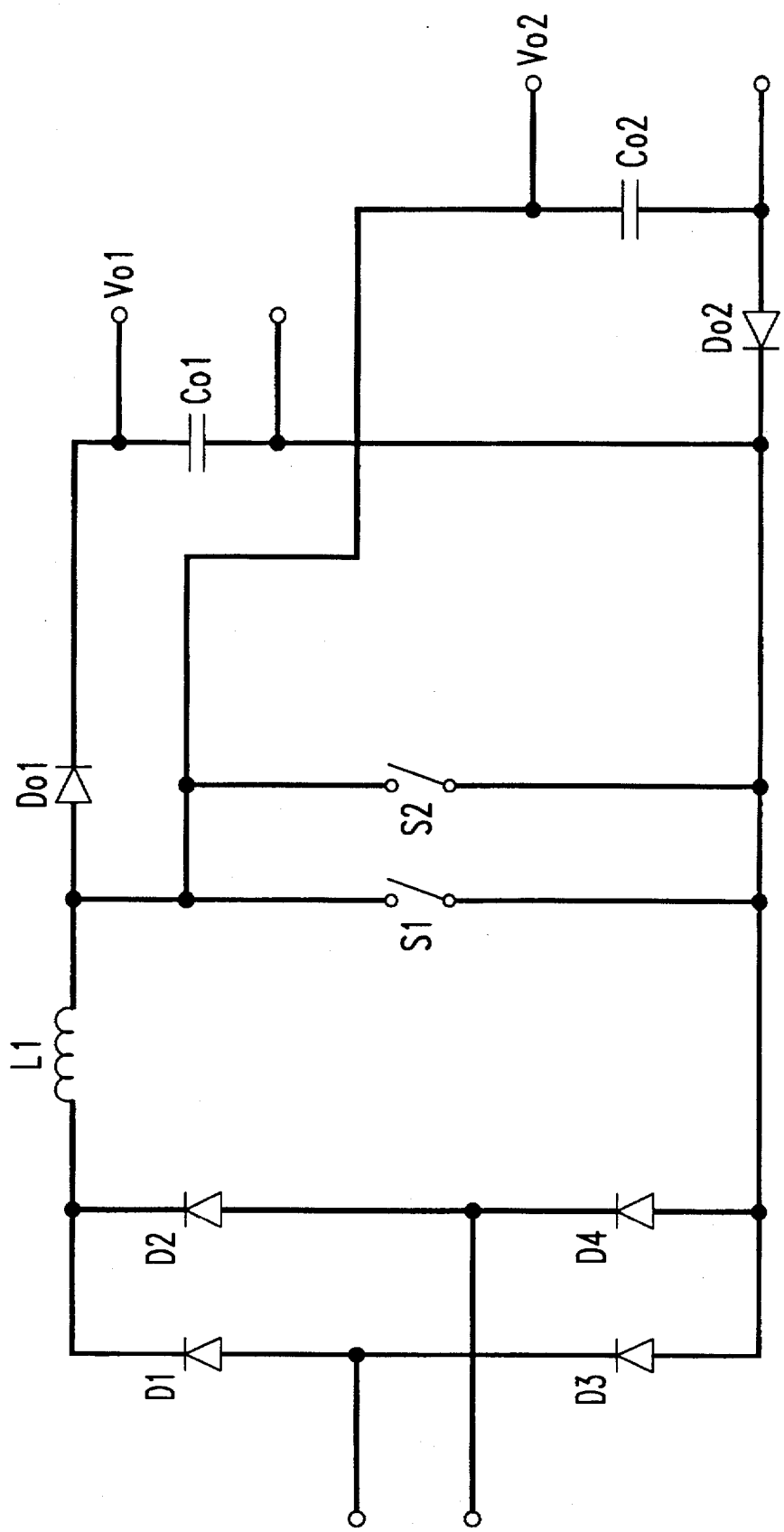
FIG. 2 illustrates a simplified schematic diagram of the boost converter of FIG. 1 at low input voltages.

Turning now to FIG. 2 and with continuing reference to FIG. 1, illustrated is a simplified schematic diagram of the boost converter 130 of FIG. 1 at low input voltages. Low input voltages Vac may exist when a peak of the input voltage Vac of the AC power is less than both the first and second output voltages Vo1, Vo2. For simplicity, the first and second output voltages Vo1, Vo2 are assumed to be equivalent in the described embodiment. Of course, those skilled in the art will realize that the first and second output voltages Vo1, Vo2 are not necessarily equivalent.

At low input voltages, if the first and second output voltages Vo1, Vo2 are equivalent, the first and second switching circuits may be operated in parallel. The controller 170, therefore, switches the contactor 150 to a second state wherein the first terminal 152 is coupled to the third terminal 156 and the second terminal 154 is coupled to the fourth terminal 158. The first and second switching circuits are thus configured in parallel across the source of AC power 120. The parallel configuration allows the first and second switches S1, S2 to share a current of the AC power, thereby reducing an overall loss associated with the first and second switches S1, S2. Since only the first or second output voltage Vo1, Vo2 is used to operate the boost converter 130, a boost switch duty-cycle may be further reduced, resulting in a corresponding reduction in conduction losses in the first and second switches S1, S2. Additionally, a smaller inductor may also be used to reduce losses in the inductor. Further, due to a lower PWM voltage amplitude, switching losses are reduced.

By changing a configuration of the boost converter 130, the contactor 150 improves the efficiency attainable with the threelevel boost converter at low input voltages.

Figure 3:
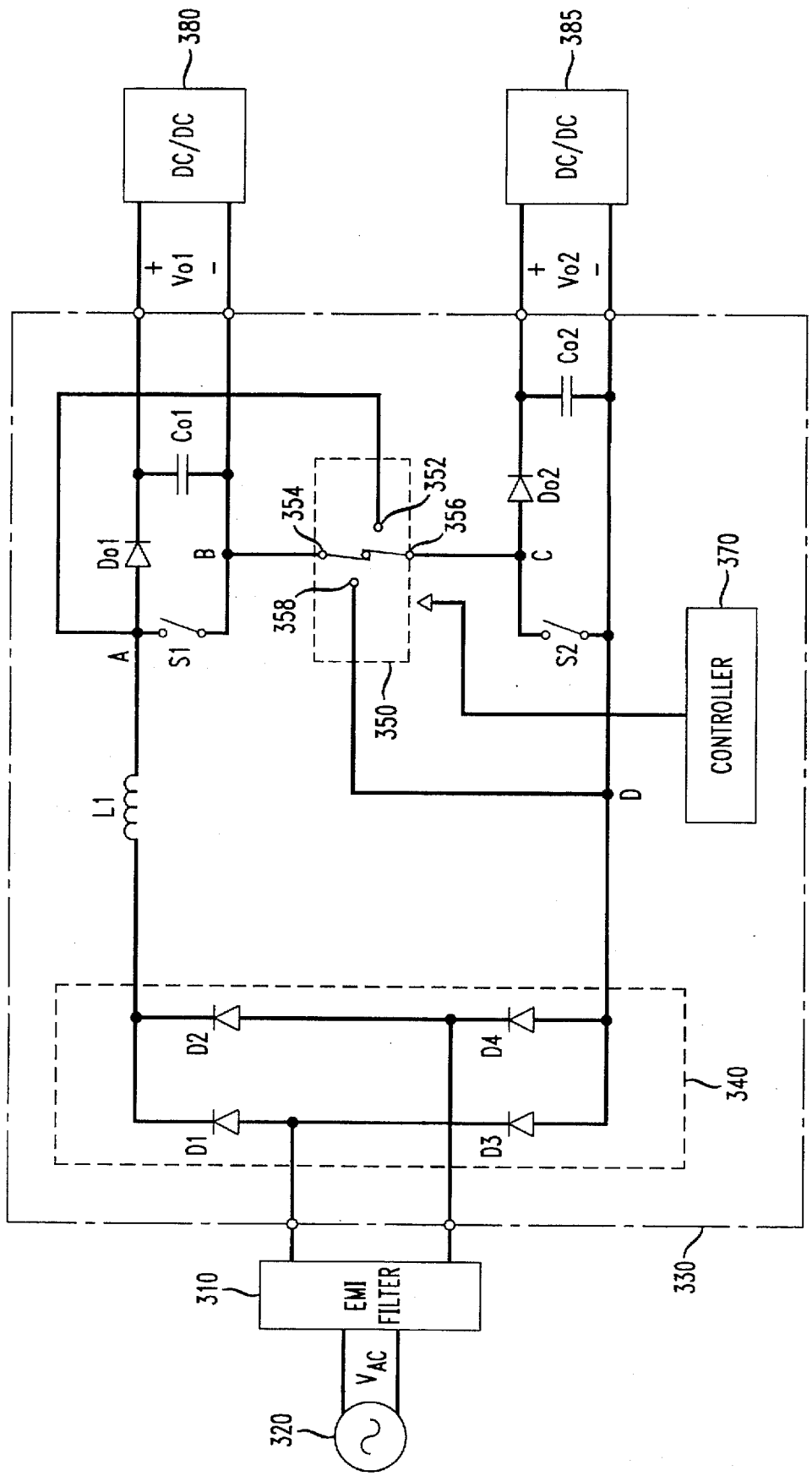
FIG. 3 illustrates a schematic diagram of another embodiment of a converter constructed according to the principles of the present invention.

Turning now to FIG. 3, illustrated is a schematic diagram of another embodiment of a converter 300 constructed according to the principles of the present invention. The converter 300 includes an EMI filter 310 coupled to a source of AC power 320 having an input voltage Vac. The converter 300 further includes a dual-output boost converter 330 having an input and first and second outputs, coupled to the EMI filter 310. The boost converter 330 receives filtered AC power at the input and generates therefrom first and second output voltages Vo1, Vo2 at the first and second outputs, respectively. The converter 300 still further includes first and second DC/DC converters 380, 385, coupled to the first and second outputs of the boost converter 330, respectively. The EMI filter 310 and the first and second DC/DC converters 380, 385 are well known in the art and, as a result, will not be described in detail.

The boost converter 330 includes a rectifier bridge 340, consisting of rectifying diodes D1, D2, D3, D4. The boost converter 330 further includes a first switching circuit, coupled, via an inductor L1, to a first rail of the rectifier bridge 340.

The boost converter 330 further includes a second switching circuit, coupled to a second rail of the rectifier bridge. The boost converter 330 still further includes a contactor 350 coupled between the first and second switching circuits and the first and second rails of the rectifier bridge. The boost converter 330 still further includes a controller 370 that switches the contactor 350 to place the first and second switching circuits in either a parallel or a series configuration.

The first switching circuit includes a first switch S1, coupled in parallel to a first capacitor Co1. The first switching circuit further includes a first output rectifying diode Do1, coupled in parallel with the first switch S1 and in series with the first capacitor Co1. A first node A, between the first switch S1 and the first output rectifying diode Do1, is coupled to a first terminal 352 of the contactor 350. A second node B, between the first switch S1 and the first capacitor Co1, is coupled to a second terminal 354 of the contactor 350.

The second switching circuit includes a second switch S2 coupled in parallel to a second capacitor Co2. The second switching circuit further includes a second output rectifying diode Do2, coupled in parallel with the second switch S2 and in series with the second capacitor Co2. A third node C, between the second switch S2 and the second output rectifying diode Do2, is coupled to a third terminal 356 of the contactor 350. A fourth node D, between the second switch S2 and the second capacitor Co2, is coupled to a fourth terminal 358 of the contactor 350.

The operation of the boost converter 330 is analogous to the operation of the boost converter 130 of FIG. 1 and will not be discussed in detail.

In the illustrated embodiment, the second output rectifying diode Do2 is relocated to provide a common ground path from the second rail of the rectifier bridge 340 to the second output. The relocation of the second output rectifying diode Do2 thus enables the second output to be EMI quiet.

Figure 4:
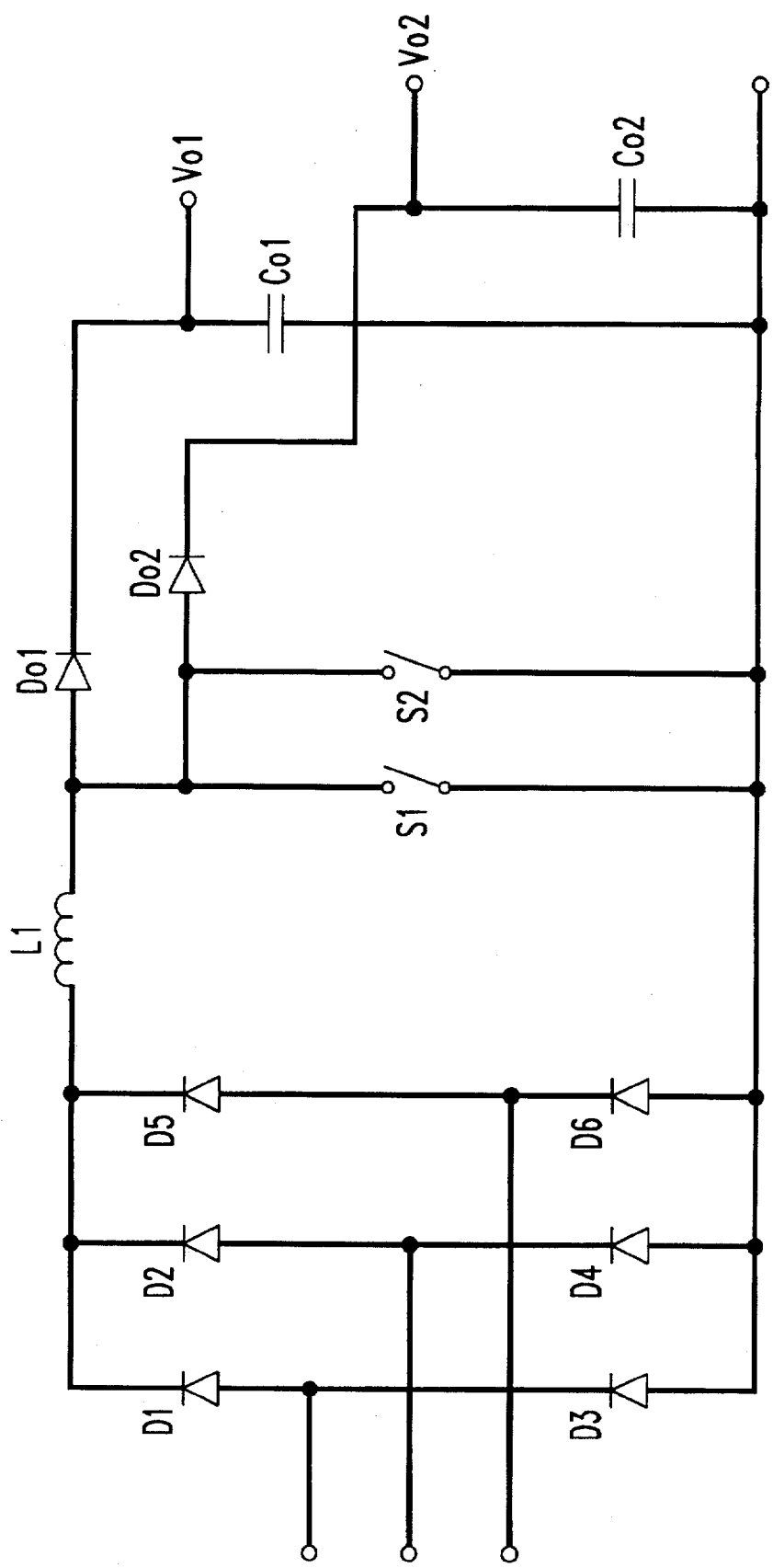
FIG. 4 illustrates a simplified schematic diagram of the boost converter of FIG. 3 at low input voltages.

Turning now to FIG. 4 and with continuing reference to FIG. 3, illustrated is a simplified schematic diagram of the converter 300 of FIG. 3 at low input voltages. Since the boost converter 330 contains MOSFETs, it may be desirable, under low input voltage conditions, to use the first and second switches S1, S2 in parallel. Under low input voltage conditions therefore, the controller 370 switches the contactor 350 to couple the first terminal 352 to the third terminal 356 and to couple the second terminal 354 to the fourth terminal 358. The first and second switches S1, S2 are thus configured in parallel across the source of AC power 320. The first and second switches S1, S2 share a current of the AC power, reducing conduction losses.

Under high input voltage conditions, however, both the first and second switches S1, S2 are required to withstand the high voltage. The controller 370, therefore, switches the contactor 350 to couple the second terminal 354 to the third terminal 356 via an intermediate terminal, thereby coupling the first and second switching circuits in series.

Again, by changing a configuration of the boost converter 330, the contactor 350 improves the efficiency attainable with the three-level boost converter.

Those skilled in the art should understand that the previously described embodiments of the boost converter (and applications employed therewith) are submitted for illustrative purposes only and other embodiments capable of providing dynamic reconfiguration to improve operating efficiency are well within the broad scope of the present invention. For a better understanding of power electronics, including power rectifiers and boost converters, see *Power Electronics: Converters, Applications and Design*, by N. Mohan, T. M. Undeland and W. P. Robbins, John Wiley & Sons Publishing Company (1989), incorporated herein by reference.

Although the present invention has been described in detail, those skilled in the art should understand that they can make various changes, substitutions and alterations herein without departing from the spirit and scope of the invention in its broadest form.

What is claimed is:

1. A boost converter for converting an input voltage received at an input thereof into first and second output voltages provided at first and second outputs thereof, respectively, comprising:

a first switching circuit coupled to a first rail of said input and having a first switch and a first capacitor coupled in parallel;

a second switching circuit coupled to a second rail of said input and having a second switch and a second capacitor coupled in parallel;

a contactor, coupled between said first and second switching circuits and said first and second rails, that is controllable to achieve alternative first and second states in which:

in said first state, said first and second switching circuits are coupled in series across said first and second rails, and in said second state, said first and second switching circuits are coupled in parallel across said first and second rails to reduce an overall loss associated with said first and second switches; and a boost inductor, coupled in series with said first and second switching circuits, that provides a conductive path for said input voltage to flow through said first and second switching circuits to charge said first and second capacitors, respectively.

2. The boost converter as recited in claim 1 wherein said first switching circuit further has a first output rectifying diode, coupled to said first switch and said first capacitor, that causes said first output voltage to be a DC voltage.

3. The boost converter as recited in claim 1 wherein a rectifier supplies said input voltage, said input voltage being a DC input voltage.

4. The boost converter as recited in claim 3 wherein said rectifier is a three-phase rectifier.

5. The boost converter as recited in claim 3 wherein said rectifier is coupled, via an electromagnetic interference (EMI) filter, to a source of AC power.

6. The boost converter as recited in claim 3 wherein said rectifier is a single-phase rectifier.

7. The boost converter as recited in claim 1 wherein said first output voltage is supplied to a first DC/DC converter and said second output voltage is supplied to a second DC/DC converter.

8. A method of converting an input voltage into first and second output voltages, comprising the steps of:

controlling a first switching circuit coupled to a first rail of said input and having a first switch and a first capacitor coupled in parallel;

controlling a second switching circuit coupled to a second rail of said input and having a second switch and a second capacitor coupled in parallel;

controlling a contactor, coupled between said first and second switching circuits and said first and second rails, to achieve alternative first and second states in which:

in said first state, said first and second switching circuits are coupled in series across said first and second rails, and in said second state, said first and second switching circuits are coupled in parallel across said first and second rails to reduce an overall loss associated with said first and second switches; and provides, with a boost inductor, a conductive path for said input voltage to flow through said first and second switching circuits to charge said first and second capacitors, respectively.

9. The method as recited in claim 8 wherein said step of controlling said first switching circuit comprises the step of causing said first output voltage to be a DC voltage, said first switching circuit further having a first output rectifying diode, coupled to said first switch and said first capacitor.

10. The method as recited in claim 8 further comprising the step of supplying said input voltage with a rectifier, said input voltage being a DC input voltage.

11. The method as recited in claim 10 wherein said rectifier is a three-phase rectifier.

12. The method as recited in claim 10 further comprising the step of filtering AC power provided from a source of AC power to said rectifier with an electromagnetic interference (EMI) filter.

13. The method as recited in claim 10 wherein said rectifier is a single-phase rectifier.

14. The method as recited in claim 8 further comprising the steps of:

supplying said first output voltage to a first DC/DC converter; and supplying said second output voltage to a second DC/DC converter.

15. A power converter, comprising:

a rectifier, couplable to a source of AC power, that provides rectified DC voltage; and a boost converter, coupled to said rectifier, that converts said rectified DC voltage received at an input thereof into first and second output voltages provided at first and second outputs thereof, respectively, including:

a first switching circuit coupled to a first rail of said input and having a first switch and a first capacitor coupled in parallel, a second switching circuit coupled to a second rail of said input and having a second switch and a second capacitor coupled in parallel, a contactor, coupled between said first and second switching circuits and said first and second rails, that is controllable to achieve alternative first and second states in which:

in said first state, said first and second switching circuits are coupled in series across said first and second rails and in said second state, said first and second switching circuits are coupled in parallel across said first and second rails to reduce an overall loss associated with said first and second switches, and a boost inductor, coupled in series with said first and second switching circuits, that provides a conductive path for said input voltage to flow through said first and second switching circuits to charge said first and second capacitors, respectively.

16. The converter as recited in claim 15 wherein said first switching circuit further has a first output rectifying diode, coupled to said first switch and said first capacitor, that causes said first output voltage to be a DC voltage.

17. The converter as recited in claim 15 wherein said first output voltage equals said second output voltage.

18. The converter as recited in claim 15 wherein said rectifier is a three-phase rectifier.

19. The converter as recited in claim 15 wherein said rectifier is coupled, via an electromagnetic interference (EMI) filter, to said source of AC power.

20. The converter as recited in claim 15 wherein said rectifier is a single-phase rectifier.

* * * * *